United States Patent [19]

Neff

[11] 4,182,360

[45] Jan. 8, 1980

[54] PRESSURE REGULATING AND FLOW CONTROL VALVE

[75] Inventor: James A. Neff, Bloomfield Township, Oakland County, Mich.

[73] Assignee: MAC Valves, Inc., Wixom, Mich.

[21] Appl. No.: 786,273

[22] Filed: Apr. 11, 1977

[51] Int. Cl.² .............................................. F16K 17/18
[52] U.S. Cl. ...................................... 137/270; 91/443; 137/599
[58] Field of Search .................. 91/443, 447; 137/493, 137/493.7, 493.8, 493.9, 599, 505.18, 270

[56] References Cited

U.S. PATENT DOCUMENTS

| | | | |
|---|---|---|---|
| Re. 29,292 | 7/1977 | Tennis | 91/447 X |
| 2,501,483 | 3/1950 | Taylor | 91/443 X |
| 3,376,792 | 4/1968 | Clarke | 137/505.18 X |
| 3,400,735 | 9/1968 | Favors | 137/505.18 X |
| 3,621,867 | 11/1971 | Johnson | 137/505.18 X |

Primary Examiner—Robert G. Nilson
Attorney, Agent, or Firm—Robert G. Mentag

[57] ABSTRACT

A combination pressure regulating and flow control valve which includes a valve body and cover means having an upstream port and a downstream port, and a fluid passage interconnecting said ports. An adjustable pressure regulating valve means is operatively mounted in said fluid passage for regulating the pressure of fluid which enters from the upstream port. In parallel with said pressure regulating valve means is optionally mounted a spring biased check valve means to allow free flow back to the upstream port if the pressure regulating valve is closed to such flow. An adjustable flow control valve means is operatively mounted in said fluid passage downstream of said regulating valve means for providing a metering action on fluid flowing through said fluid passage. In parallel with said flow control valve means is a spring biased check valve means. Said last named check valve means can be interchangeably mounted to either allow free flow from said regulating means to said downstream port and prevent reverse flow except through said flow control valve means, or to prevent flow from said regulating means to said downstream port except through said flow control valve means and to allow free flow from said downstream port to said regulating valve. A parallel second fluid passage may be incorporated in the valve body from said upstream port to said downstream port. Operably mounted in said parallel second fluid passage is an adjustable spring loaded check valve means. This check valve is mounted so as to prevent flow from said upstream port to said downstream port. When flow takes place from said downstream port to said upstream port the adjustable spring means can be set to allow no flow through said parallel passage, or to allow flow until a preset pressure at the downstream port is reached then to close against flow, or to allow free flow from said downstream port to said upstream port.

16 Claims, 21 Drawing Figures

PRESSURE REGULATING AND FLOW CONTROL VALVE

BACKGROUND OF THE INVENTION

1. Field of the Invention

This invention relates generally to valve mechanisms, and more particularly to an improved valve mechanism which combines the functions of pressure regulating and fluid flow control. The combination pressure regulating and flow control valve of the present invention is adapted for many uses as, for example, for controlling the operation of an air cylinder in either one direction or both directions.

2. Description of the Prior Art

It is known in the valve art to provide pressure regulation to individual or multiple directional control valves with single or multiple pressure regulators to control the pressure supplied to the device being controlled. The use of multiple pressure regulators is expensive and awkward requiring special directional control valves and excessive piping. Where multiple directional valves are mounted in stacking fashion or on a common manifold base, it is extremely difficult and expensive to provide pressure regulation to individual outlets. It is not common to use such pressure regulators in the line between the outlet or cylinder port of the directional valve and the device being controlled because of cost, space and the relatively short life of diaphragms and other components of pressure regulators. It is common to provide flow control means in the line between the directional control valve and the device being controlled. Because of cost, complexity and space requirements, it has not been practicable in the past to provide both pressure regulator means and flow control means between the cylinder port of the directional control valve and the device being controlled. The result has been a waste of air requiring excessive pumping capacity, a waste of energy, and increase in the cost of using air as a power and control means.

SUMMARY OF THE INVENTION

In accordance with the present invention, a combination pressure regulating and flow control valve is provided which can be installed in any cylinder or actuation line to control both the pressure and flow of air in that line. The combination valve of the present invention includes an adjustable pressure regulator valve means which is constructed and arranged to regulate the supply pressure to an air cylinder being controlled by the valve of the present invention. The valve of the present invention also includes an adjustable flow control valve for controlling the flow of air to or from the air cylinder being controlled by the valve so as to control the return speed of the air cylinder. A relief check valve is provided for forcing the flow of fluid through the valve to the adjustable pressure regulator valve means upon energization of the control valve, and which is operable to provide return flow through the valve from a wide open or free flow condition to a metered out flow condition in cooperation with the adjustable flow control valve. The adjustable flow control valve means is used in series with the adjustable pressure regulator valve means to provide either a metered in or metered out condition, with pressure regulation and flow control, and a free flow out or free flow in condiction, respectively. A second check valve means is operatively mounted in parallel with the adjustable fluid flow control valve means for providing a free flow action to fluid flowing in a direction opposite to the metering action of the flow control means. The last mentioned check valve means is made as a reversible cartridge valve in one embodiment so that in one position it provides a free flow out action to fluid flowing in one direction, and when reversed to another position, it provides a free flow in action to fluid flowing in the other direction. The combination pressure regulating and flow control valve is also provided in other embodiments of the invention with an adjustable quick exhaust valve means for quickly exhausting the downstream pressure through a second parallel fluid flow passage, simultaneously with the exhaust of fluid flow through the first named passage and check valve means.

The combined pressure regulating and flow control valve of the present invention overcomes the disadvantages of the aforementioned prior art structures in that no separate pressure regulating device is required to reduce the pressure down to a required lower operating pressure, whereby a saving of air is provided at a minimum of cost. The pressure regulating and flow control valve of the present invention also provides a control over the speed of an air cylinder, whereby the air cylinder may be efficiently operated in either direction and at a savings of air. The valve of the present invention is advantageous in that it provides in one compact and economical unit the combined functions of pressure regulating and flow control.

The combination pressure regulating and flow control valve of the present invention also includes a quick exhaust function which provides a quick dump exhaust characteristic in addition to the pressure regulating and flow control characteristics.

Other features and advantages of this invention will be apparent from the following detailed description, appended claims, and the accompanying drawings.

DESCRIPTION OF THE PREFERRED EMBODIMENT

Figure 1:
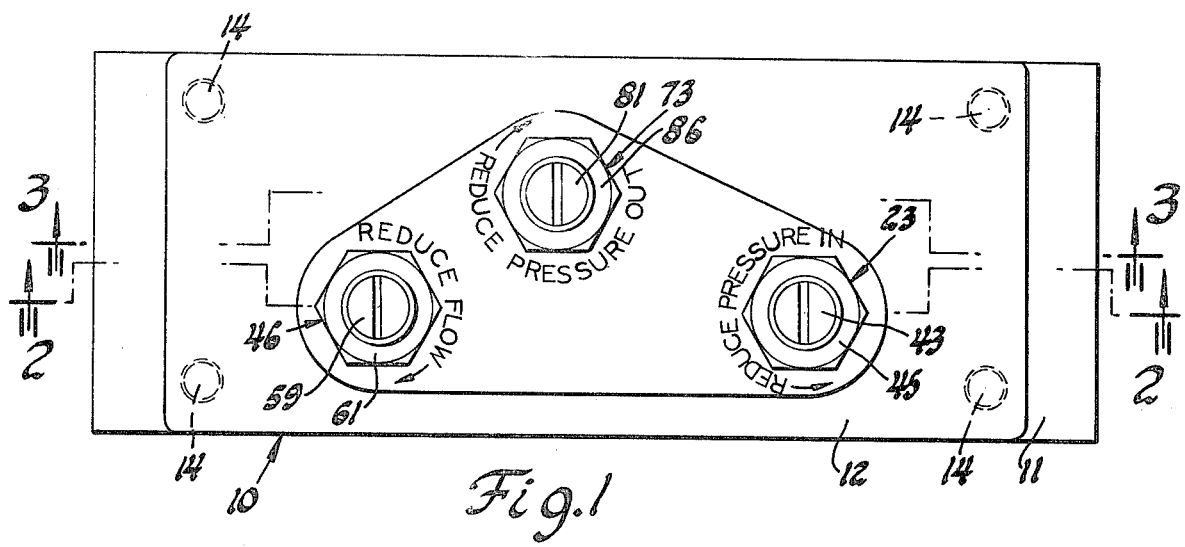
FIG. 1 is a top plan view of a first embodiment of a combination pressure regulating and flow control valve made in accordance with the principles of the present invention.
Figure 2:
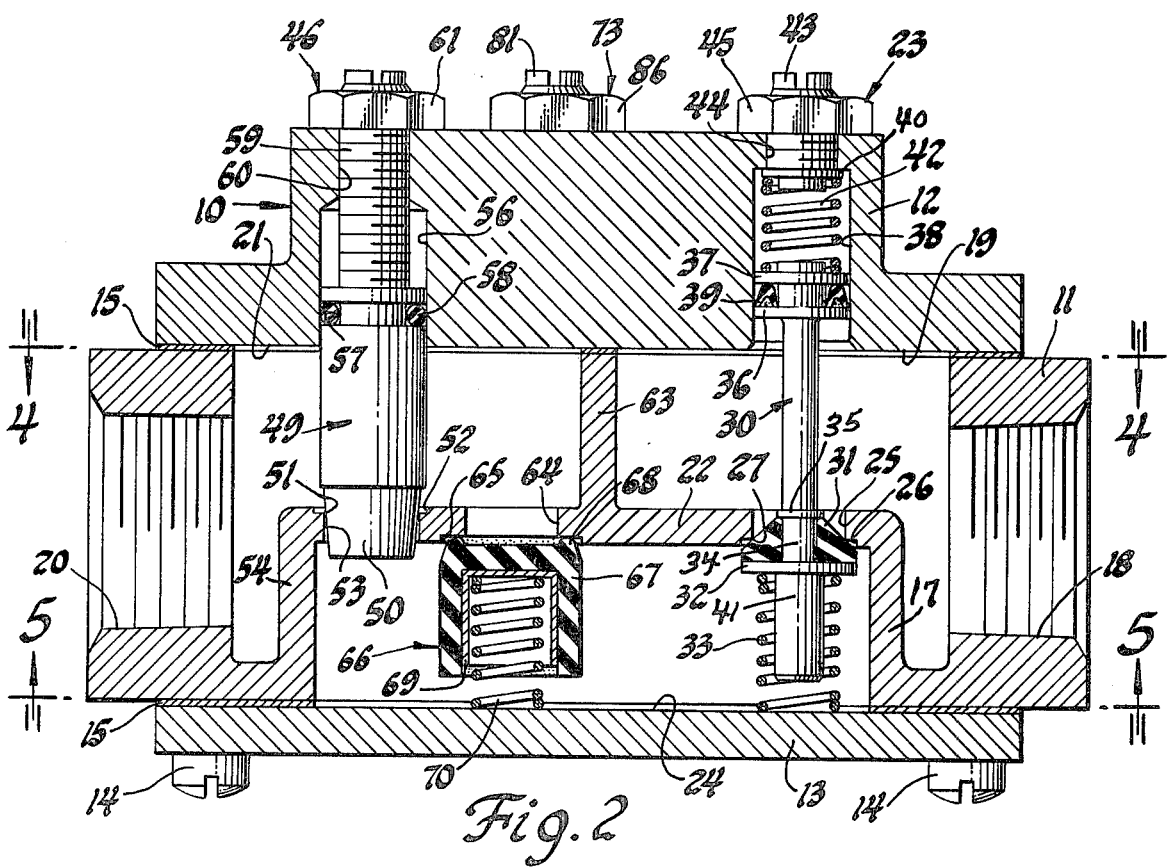
FIG. 2 is an elevation section view of the valve structure illustrated in FIG. 1, taken along the line 2—2 thereof, and looking in the direction of the arrows.

Referring now to the drawings, and in particular to FIGS. 1 and 2, the numeral 10 generally designates a first illustrative embodiment of a combination pressure regulating and flow control valve made in accordance with the principles of the present invention. The valve 10 includes a valve body 11, a top end cover 12 and a bottom end cover 13. A suitable gasket 15 is disposed between the end covers 12 and 13, and the valve body 11. The end covers 12 and 13 are secured to the valve body 11 by any suitable means, as by suitable machine screws 14 which extend through the bottom end cover, and up through the valve body 11, and into threaded engagement with suitable threaded apertures in the top end cover 12.

The valve body 11 is provided with a threaded supply or upstream port 18 which would be connected by suitable conduit means to a suitable source of supply of pressurized air or other fluid. The supply port 18 communicates with an interior upper passageway 19 which is formed in the upper end of the valve body 11 and which is enclosed by the top end cover 12. The valve body 11 is further provided with a threaded outlet or downstream port 20 which communicates with an upper interior passageway 21 that is formed in the valve body 11 and which is enclosed on its upper side by the top end cover 12. The interior upper passageway 19 is enclosed at its lower end by the valve body interior walls 17 and 22, as shown in FIG. 2. A bore or passageway 25 is formed through the valve body interior wall 22 for communicating the upper interior passageway 19 with the lower interior passageway 24. The lower interior passageway 24 is formed in the valve body 11 and is enclosed on its lower end by the bottom end cover 13. The lower interior passageway 24 communicates with the upper interior passageway 21 through a bore or passageway 53 formed through the interior valve body wall 22. As shown in FIG. 2, the upper interior passageway 21 is bounded on its lower side by the valve body interior walls 22 and 54.

As shown in FIGS. 2, a pressure regulator valve, generally indicated by the numeral 23, is operatively mounted in the vertical bore 25 for controlling the flow of fluid between the upper interior passageway 19 and the lower interior passageway 24. As shown in FIG. 2, the lower end of the bore 25 is enlarged, as indicated by the numeral 26, and the junction point between the enlarged bore portion 26 and the bore 25 comprises a valve seat 27, which may be conically formed. The adjustable pressure regulator valve 23 includes a novel one-piece poppet valve element 31 which is bonded to the lower portion 34 of a lower valve stem, generally indicated by the numeral 30. The valve element 31 terminates at its upper end at an integral annular shoulder 35, and at its lower end at a larger integral annular shoulder 32. The valve element 31 may be normally lightly biased in the closing direction by a suitable spring 33 which is mounted around the enlarged lower end 41 of the valve stem 30. The lower end of the spring 33 abuts the inner face of the bottom end cover 13. The upper end of the spring 33 abuts the lower side of the annular shoulder 32.

As shown in FIG. 2, the upper end of the valve stem 30 is provided with a pair of annular shoulders or flanges 36 and 37 which are slidably mounted in the lower end of a bore 38 that is formed in the top end cover 12. A suitable balancing seal means 39 is mounted between the shoulders 36 and 37. A spring 42 is mounted in the bore 38, and its lower end is seated around the upper end of the valve stem 30. The spring 42 extends upward and is seated against a wear washer 40 that is carried on the lower or inner end of a threaded upper valve stem 43. The valve stem 43 is threadably mounted in a reduced diameter threaded bore 44 which extends inwardly from the upper face of the top end cover 12, and communicates with the upper end of the bore 38. The valve stem 43 is shown in FIG. 2 in its maximum upward adjusted operable position since the wear washer 40 is larger in diameter than the bore 44 and abuts the top end cover and restricts any further upward adjustment movement of the spring 42. The valve stem 43 may be adjusted inwardly to increase the pressure of the adjustable spring 42 acting on the lower valve stem 30.

The valve stem 43 is locked in a desired adjusted position by a suitable lock nut 45. It will be seen that the pressure regulator valve 23 is essentially a balanced spring biased poppet valve. The upper valve stem 43 is adjusted inwardly to bias the conical valve element 31 to the open position by the adjustable spring 42 to allow a free flow of fluid thereby from the upstream port 18. When fluid flow starts, the downstream pressure exerts a force on the lower side of the valve element 31 exposed to said downstream pressure. When such force equals the force exerted by the adjustable spring 42, the valve element 31 will close to flow, being urged by the fixed spring 33 to the closed position on the valve seat 27. In the closed condition, the force of the inlet fluid pressure is balanced between the conical inlet seat 27 and the pressure balancing seal means 39. Therefore, variations in inlet pressure can cause only small variations in the downstream pressure.

As shown in FIG. 2, an adjustable fluid flow control means, generally indicated by the numeral 46, is vertically disposed in the valve body 11, at right angles to the ports 18 and 20. The flow control means 46 includes a valve stem, generally indicated by the numeral 49, which has formed on the lower end thereof a conically shaped valve 50 which may be termed a needle valve. The needle valve 50 is adapted to extend down through the bore 53, and to be seated in its closed position on a valve seat 51 formed at the junction between the bore 53 and an enlarged diameter bore 52 at the upper end of the bore 53. The upper end of the valve stem 49 is slidably mounted in a bore 56 formed in the inner end of the top end cover 12. A suitable O-ring seal 58 is operatively mounted in a peripheral groove 57 formed around the upper end 59 of the valve stem 49 for sealing engagement with the surface of the bore 56. The valve stem 49 is provided with a reduced diameter threaded upper end portion 59 which is threadably mounted through a threaded bore 60 that is formed in the upper end of the top end cover 12 and which communicates with the bore 56. The valve stem 49 is held in a desired adjusted position by a suitable lock nut 61. The adjustable fluid flow control means 46 is shown in a closed position. In use, the valve stem 49 would be adjusted upwardly to permit fluid flow through the passageway 53 at a desired controlled rate. It will be seen that when fluid is flowing from the lower interior passageway 24 upwardly through the passageway 53 and into the upper interior passageway 21, that the fluid will be subjected to a meter in action.

As shown in FIG. 2, the lower interior passageway 24 also communicates with the upper interior passageway 21 through a bore or passageway 64 formed in the valve body wall 22. The upper interior passageway 21 is bounded on the right side, as viewed in FIGS. 2 and 4, by the vertical valve body interior walls 62 and 63. The lower end of the bore 64 is enlarged, as indicated by the numeral 65, to form a seat for a check valve means, generally indicated by the numeral 66. The check valve means 66 includes a cup-shaped valve body 67 having an open lower end and which is made from a suitable elastomeric material, and provided with a cup-shaped liner 69 that is made from any suitable material, as for example, stainless steel. A suitable spring 70 has its upper end mounted within the cup-shaped liner 69, and its lower end extended downwardly and seated against the inner face of the bottom end cover 13.

The cup-shaped check valve body 67 is provided on its closed upper end with an integral, annular, axially extended projection 68 which is adapted to be seated around the lower end of the passageway 64 in the lower bore portion 65 for enclosing the bore 64 in a valve closing action. It will be seen that the spring 70 normally maintains the check valve 66 in the closed position, shown in FIG. 2, to prevent flow of air or other fluid from the lower interior passageway 24 upwardly into the interior upper passageway 21 when the flow of fluid is flowing through the valve 10, from the upstream port 18 to the downstream port 20. However, when the flow of fluid through the valve 10 is in the reverse direction, that is from the upper interior passageway 21 downwardly into the lower interior passageway 24, then the check valve 66 would be biased downwardly by the returning fluid flow pressure and moved to an open position to permit the fluid to exhaust through the bore 64 and into the lower interior passageway 24 and then upwardly through the bore 25 and into the upper interior passageway 19 and out the port 18. It will be understood that the bore 25 would be in the open position with the poppet valve element 31 adjusted downwardly to a normally open position.

Figure 3:
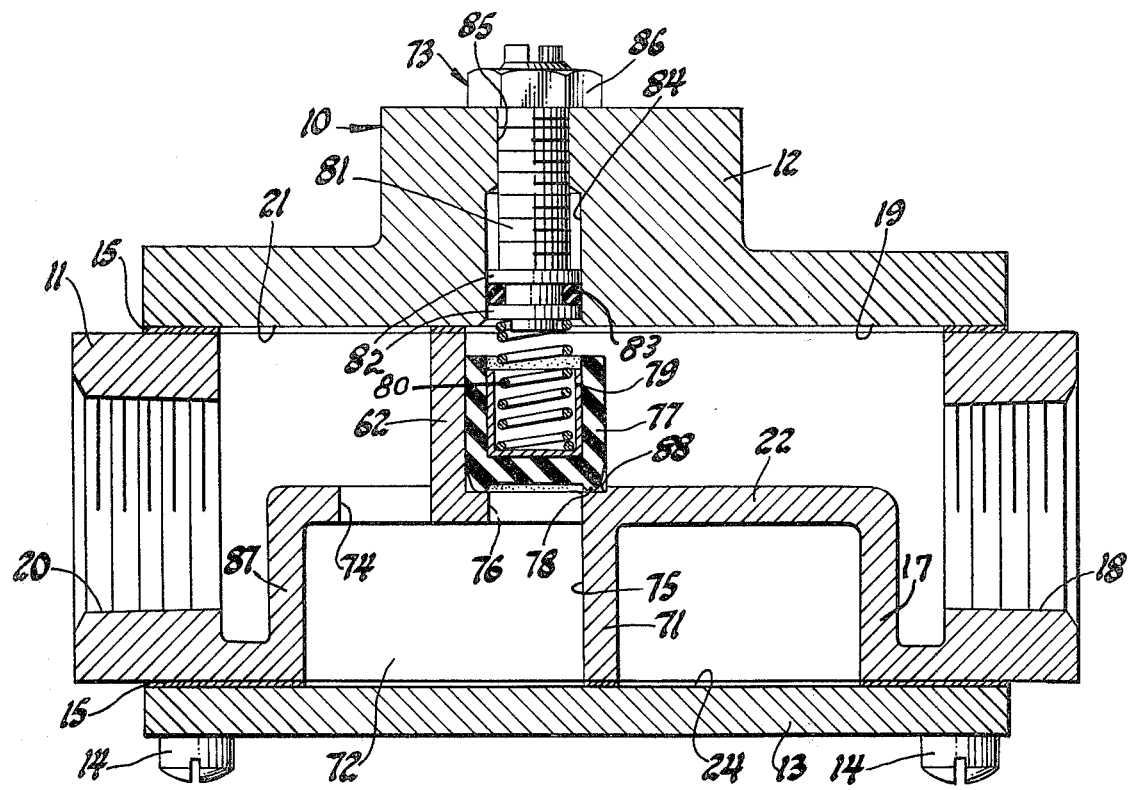
FIG. 3 is an elevation section view of the valve structure illustrated in FIG. 1, taken along the line 3—3 thereof, and looking in the direction of the arrows.
Figure 4:
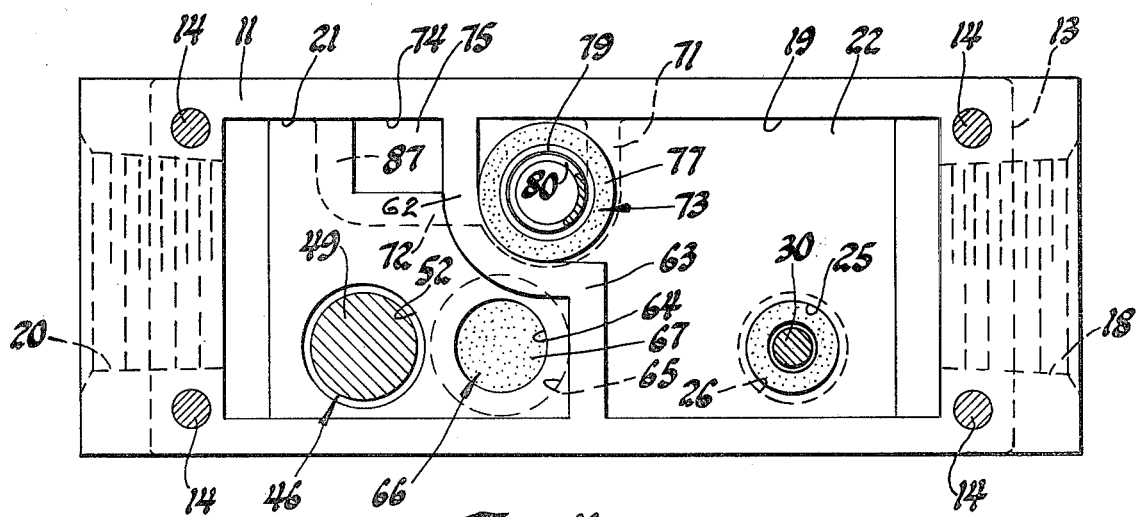
FIG. 4 is a top plan view of the valve body structure illustrated in FIG. 2, with the top end cover removed, taken along the line 4—4 thereof, and looking in the direction of the arrows.
Figure 5:
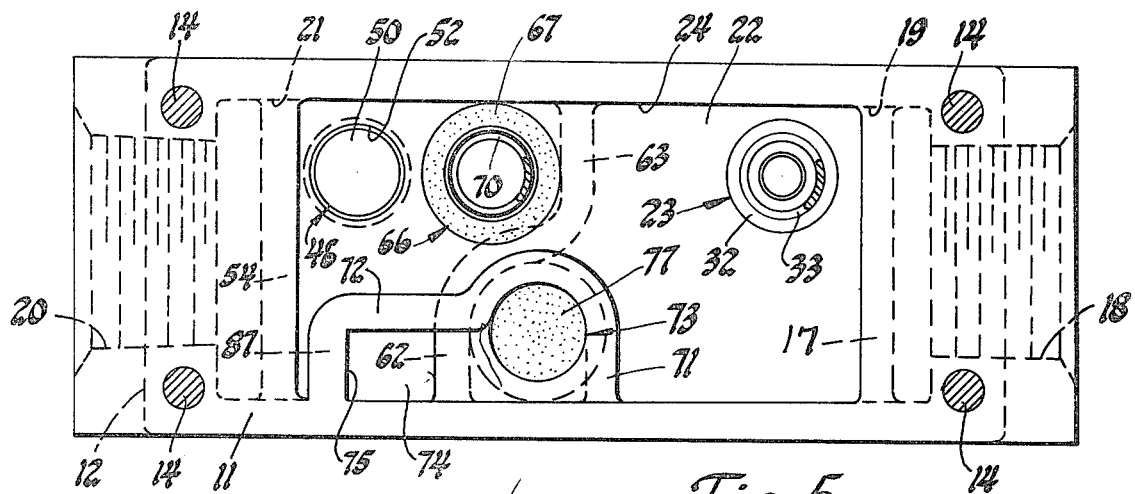
FIG. 5 is a bottom plan view of the valve body structure illustrated in FIG. 2, with the bottom end cover removed, taken along the line 5—5 thereof, and looking in the direction of the arrows.

As shown in FIGS. 3, 4 and 5, the valve 10 is further provided with a pre-exhaust valve means, generally indicated by the numeral 73, and it includes a cup-shaped valve body member 77 which is made from a suitable elastomeric material and which is provided with a cup-shaped liner 79. The valve body 77 is open on the upper end thereof, and has operatively mounted therein the liner 79 which is made from any suitable material, as for example, a stainless steel. The cup-shaped valve body member 77 has an integral, annular, axially extended projection 78 which is adapted to be seated in the enlarged upper end 88 of a bore or passageway 76 for communicating the upper interior passageway 19 with a lower interior passageway 75. The passageway 75 is formed in the valve body 11 by the interior valve body walls 22, 71, 72 and 87, and the bottom end cover 13. The lower interior passageway 75 is connected to the upper interior passageway 21 through a passageway 74, as shown in FIGS. 3 and 4.

The cup-shaped valve body 77 is normally biased downwardly to the closed position shown in FIG. 3 by a suitable spring cushion or spring means 80. One end of the spring means 80 is seated in the cup-shaped liner 79, and the other end is seated against the lower end of an adjustable valve stem 81. The valve stem 81 has a pair of enlarged annular flanges or shoulders 82 which are slidably mounted in a vertical bore 84 that is formed in the top end cover 12 and which communicates with the upper interior passageway 19. A suitable O-ring seal means 83 is mounted between the shoulders 82, and sealingly engages the surface of the bore 84. The upper end of the valve stem 81 is threaded, and it is threadably mounted through a threaded bore 85 formed in the top end cover 12 as an extension of the bore 84. The valve stem 81 is secured in a desired adjusted position by a suitable lock nut 86. It will be seen that the pre-exhaust valve 73 controls the return of fluid between the ports 20 and 18 through a parallel passage formed by the upper interior passageway 21, passageway 74, passageway 75, passageway 76, and the upper interior passageway 19. The valve stem 81 may be adjusted to provide a desired spring closing pressure on the cup-shaped valve 77 to control the flow of fluid through this second or parallel return flow path for exhausting and returning fluid from the port 20 and through the valve 10 and out the upstream port 18.

In use, the valve 10 receives fluid under pressure at the upstream or supply port 18 from whence it passes into the upper interior passageway 19 and then down through the passageway 25 past the poppet valve element 31 and into the lower interior passageway 24. The fluid then flows past the closed check valve 66 and up through the passage 53 around the flow control valve 50 and into the upper interior passageway 21 and then out the downstream port 20. The flow control valve 46 provides a meter in action on the fluid flowing therearound. The valve 23 provides a pressure regulating action on the fluid when it is flowing through this valve from right to left, as viewed in FIG. 2. It will be seen that as the fluid pressure builds up downstream, on the downstream side of the poppet valve element 31, the pressure tends to move the poppet valve element 31 upwardly to a closed position against the force of the spring 42.

Figure 6:
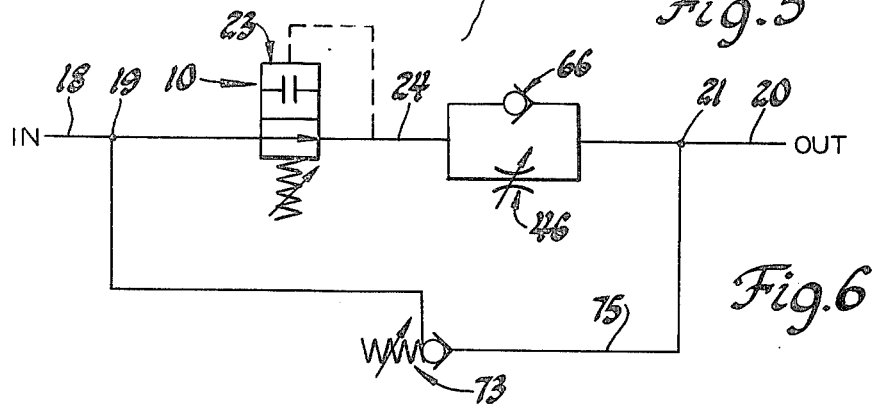
FIG. 6 is a schematic view of the valve structure illustrated in FIGS. 1 through 5, and showing the various functions carried out by the valve.

When fluid is exhausted through the valve 10 by flowing into the port 20 and through the valve 10 and out the port 18, the adjustable pre-exhaust valve means 73 (FIG. 6) opens up immediately to permit downstream pressure to pass from the upper interior passageway 21 downwardly through the passageway 74 and into the lower passageway 75, and thence upwardly through the passageway 76 and into the upper interior passageway 19 and out the upstream port 18. When the pressure of the exhausting fluid drops to a predetermined level set by the spring means 80 of the adjustable pre-exhaust valve means 73, the pre-exhaust valve means 73 closes. It will be understood that simultaneously with the opening of the pre-exhaust valve means 73, that some of the exhausting fluid also passes from the upper passageway 21 downwardly past the adjustable fluid flow control valve means 46 and downwardly into the lower interior passageway 24. The check valve 66 also simultaneously opens to allow a free flow of fluid from the upper interior passageway 21 downwardly into the lower interior passageway 24, and then out the passageway 25 past the open poppet valve 31 and up into the upper interior passageway 19 and out the port 18. However, when the pre-exhaust valve means 73 closes, the last two mentioned dual exhaust paths still remain open with the main return being a free flow through the open check valve 66. It is thus seen that the valve 10 provides a pressure regulating action and a meter in action on fluid flowing into a device, such as one end of an air cylinder, and a pre-exhaust and free flow action on the exhausting fluid from said one end of a device such as an air cylinder. Also, on the return stroke of the air cylinder or other device where it is desired to return the cylinder at a certain speed, the pre-exhaust valve 73 permits the dumping of the pressure resisting return movement of the cylinder to a predetermined level, whereby the cylinder may be returned at a desired speed.

Figure 7:
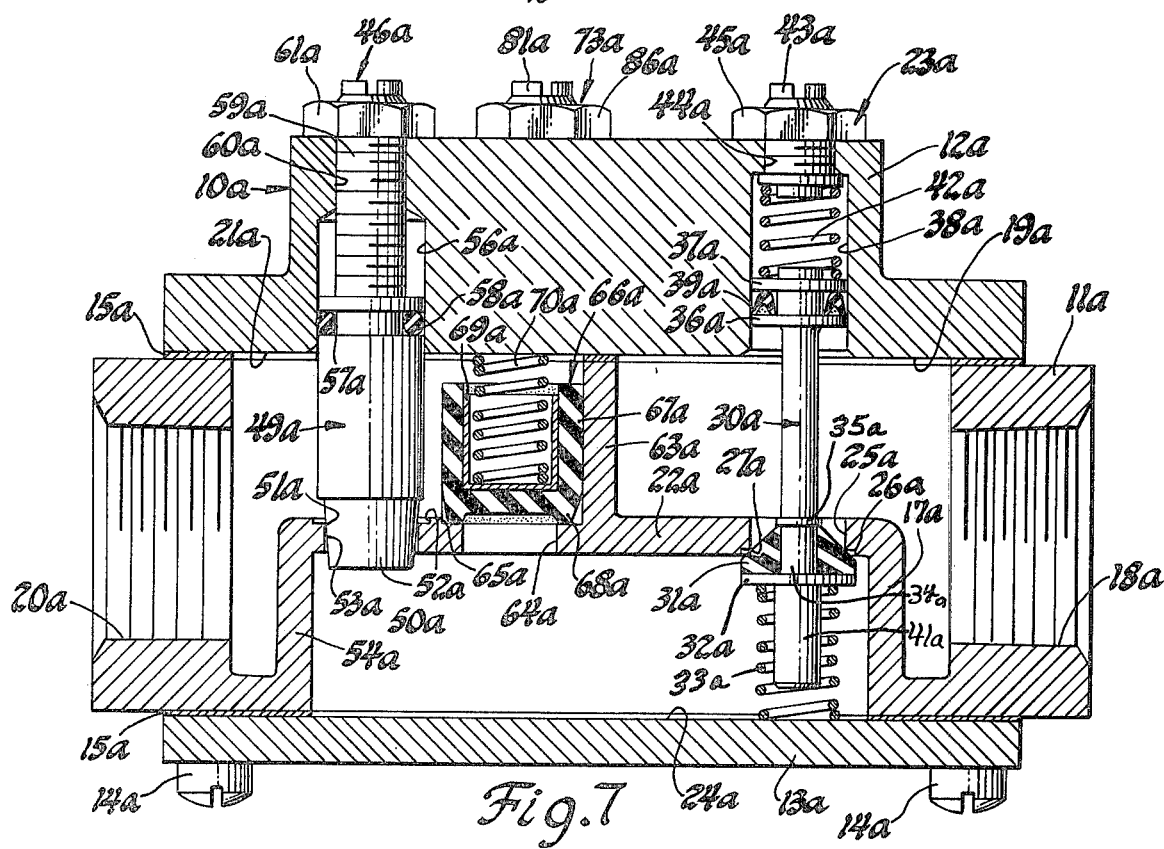
FIG. 7 is an elevation section view of a second valve embodiment made in accordance with the principles of the present invention.
Figure 8:
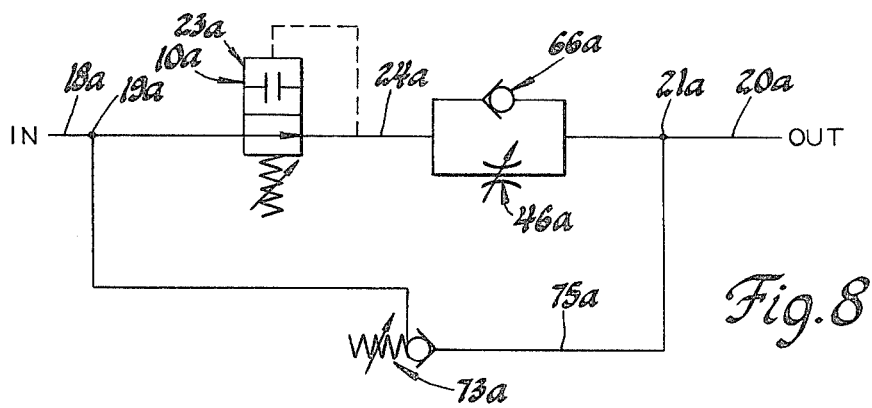
FIG. 8 is a schematic view of the valve structure illustrated in FIG. 7, and showing the various functions carried out by the valve.

FIGS. 7 and 8 illustrate a second embodiment of the invention which is generally indicated by the numeral 10a. The parts of the embodiment illustrated in FIGS. 7 and 8 which are the same as the first described embodiment of FIGS. 1 through 6 have been marked with the same reference numerals followed by the small letter "a".

The embodiment of FIGS. 7 and 8 discloses the same valve structure as that shown in FIGS. 1 through 6, with the exception that the check valve 66a is inverted so as to provide a free flow path from the lower interior passageway 24a when fluid is flowing from the supply port 18a through the valve 10a and out the port 20a. In the embodiment illustrated in FIGS. 7 and 8, when fluid is exhausting or returning through the valve 10a, it enters the port 20a and passes into the upper interior passageway 21a and thence down past the flow control valve means 46a to provide a meter out action on the returning fluid. The returning fluid maintains the check valve 66a in the closed position. The returning fluid metered out into the lower interior passageway 24a passes upwardly through the passage 25a, around the open regulating poppet valve element 31a, and into the upper interior passageway 19a and then out through the upstream port 18a. In the embodiment of FIGS. 7 and 8, the pre-exhaust valve 81a would function in the same manner as described hereinbefore for the first embodiment of FIGS. 1 through 6 on the return stroke of an air cylinder where it is desired to return the cylinder at a certain speed. That is, the pre-exhaust valve 73a would permit the quick dumping of the pressure resisting return movement of the cylinder to a predetermined level, whereby the cylinder may be returned at a desired speed under a meter out action by the flow control valve 49a.

Figure 9:
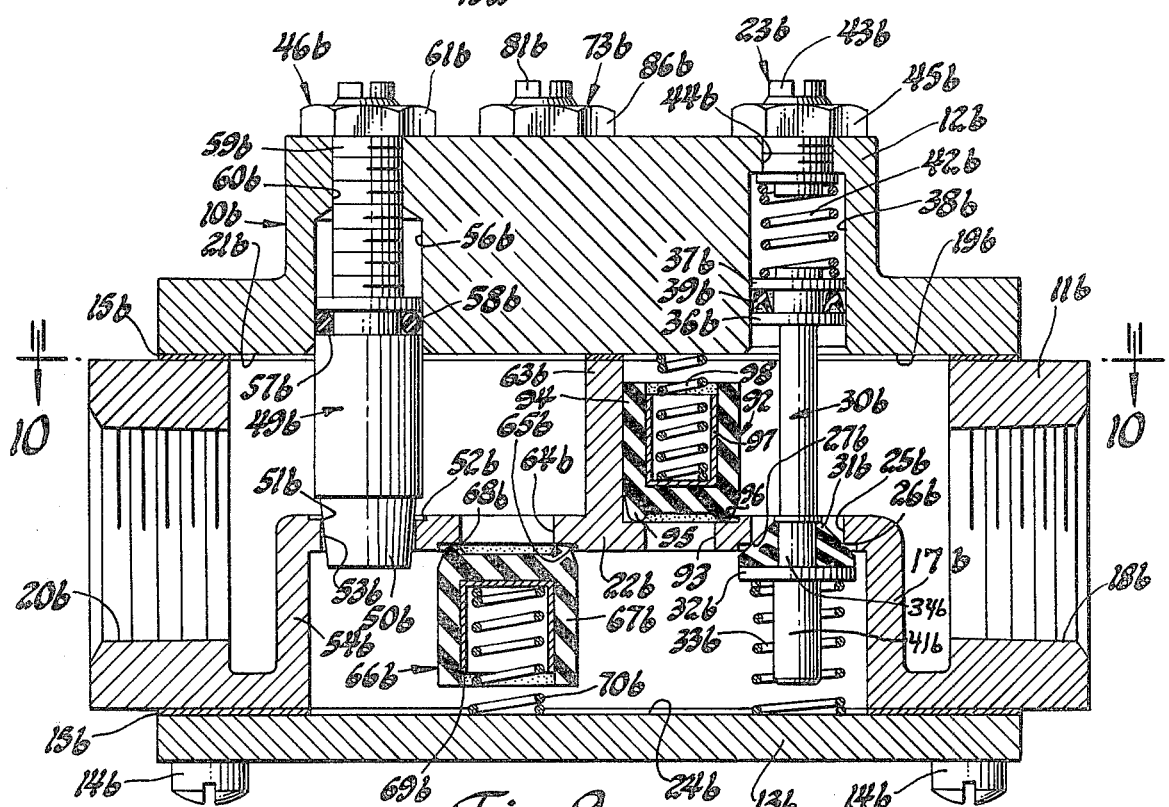
FIG. 9 is an elevation section view of a third valve embodiment made in accordance with the principles of the present invention.
Figure 10:
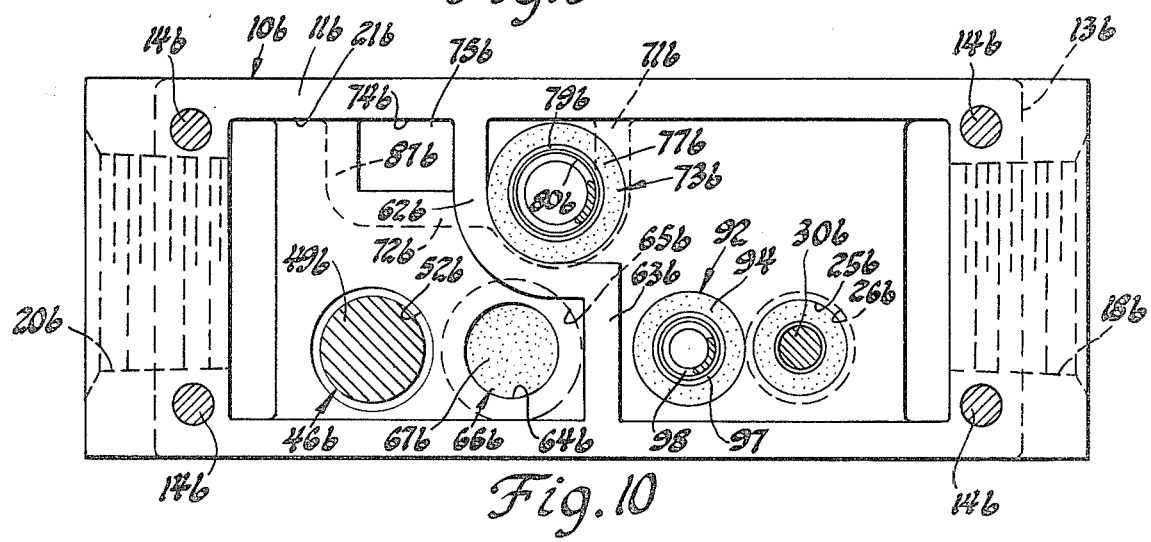
FIG. 10 is a top plan view of the valve structure illustrated in FIG. 9, with the top end cover removed, taken along the line 10—10 thereof, and looking in the direction of the arrows.
Figure 11:
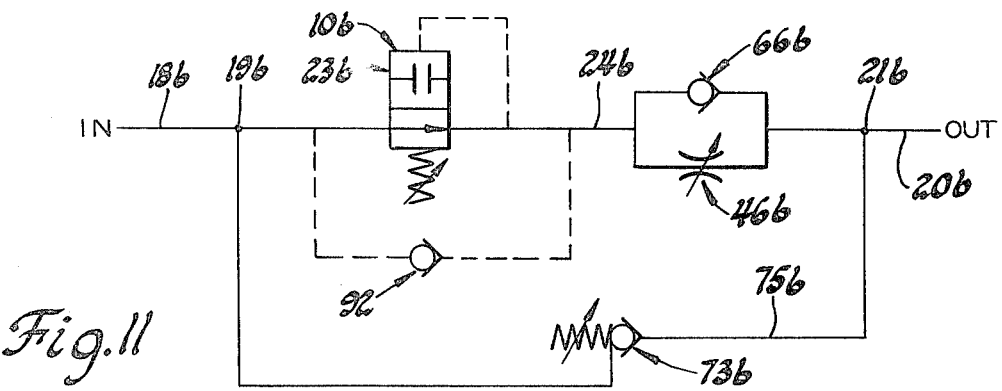
FIG. 11 is a schematic view of the valve structure illustrated in FIGS. 9 and 10, and showing the various functions carried out by the valve.

FIGS. 9, 10 and 11 illustrate a third embodiment of the invention which is generally indicated by the numeral 10b. The parts of the embodiment illustrated in FIGS. 9, 10 and 11 which are the same as the first described embodiment of FIGS. 1 through 6 have been marked with the same reference numerals followed by the small letter "b".

The embodiment of FIGS. 9, 10 and 11 discloses the same valve structure as that shown in FIGS. 1 through 6 with the addition of a second check valve, generally indicated by the numeral 92, which functions to provide a free flow return path from the lower interior passageway 24b around the pressure regulating poppet valve element 31b. As shown in FIG. 9, a bore or passageway 93 connects the upper interior passageway 19b with the lower interior passageway 24b in a path parallel to the passageway 25b for the pressure regulating valve means 23b. The upper end of the bore or passageway 93 is enlarged, as indicated by the numeral 96, so as to form a seat for the check valve 92. The check valve 92 is constructed in the same manner as the check valve 66b.

The check valve 92 includes a cup-shaped valve body 94 which is made from a suitable elastomeric material, and which is provided with a cup-shaped liner 97. The valve body 94 is open on the upper end thereof and has operatively mounted therein the liner 97 which is made from any suitable material, as for example, a stainless steel. The cup-shaped valve body 94 has an integral, annular, axially extended projection 95 which is adapted to be seated in the enlarged upper end 96 of the passageway or bore 93. The cup-shaped body 94 is normally biased downwardly to the closed position shown in FIG. 9 by a suitable spring cushion or spring means 98. One end of the spring means 98 is seated in the cup-shaped liner 97 and the other end is seated against the lower inner face of the top end cover 12b.

It will be seen that fluid passing into the supply port 18a and through the valve 10b to the downstream port 20b will maintain the check valve 92 in the closed position, but that when the fluid flow through the valve 10b is in the opposite direction, that the valve 92 will open to allow a free flow of fluid around the pressure regulating valve 23b, from the lower interior passageway 24b up through the passageway 93 and into the upper interior passageway 19b and out the port 18b. In the embodiment of FIGS. 9, 10 and 11, the pre-exhaust valve 81b would function in the same manner as described hereinbefore for the embodiment of FIGS. 7 and 8.

Figure 12:
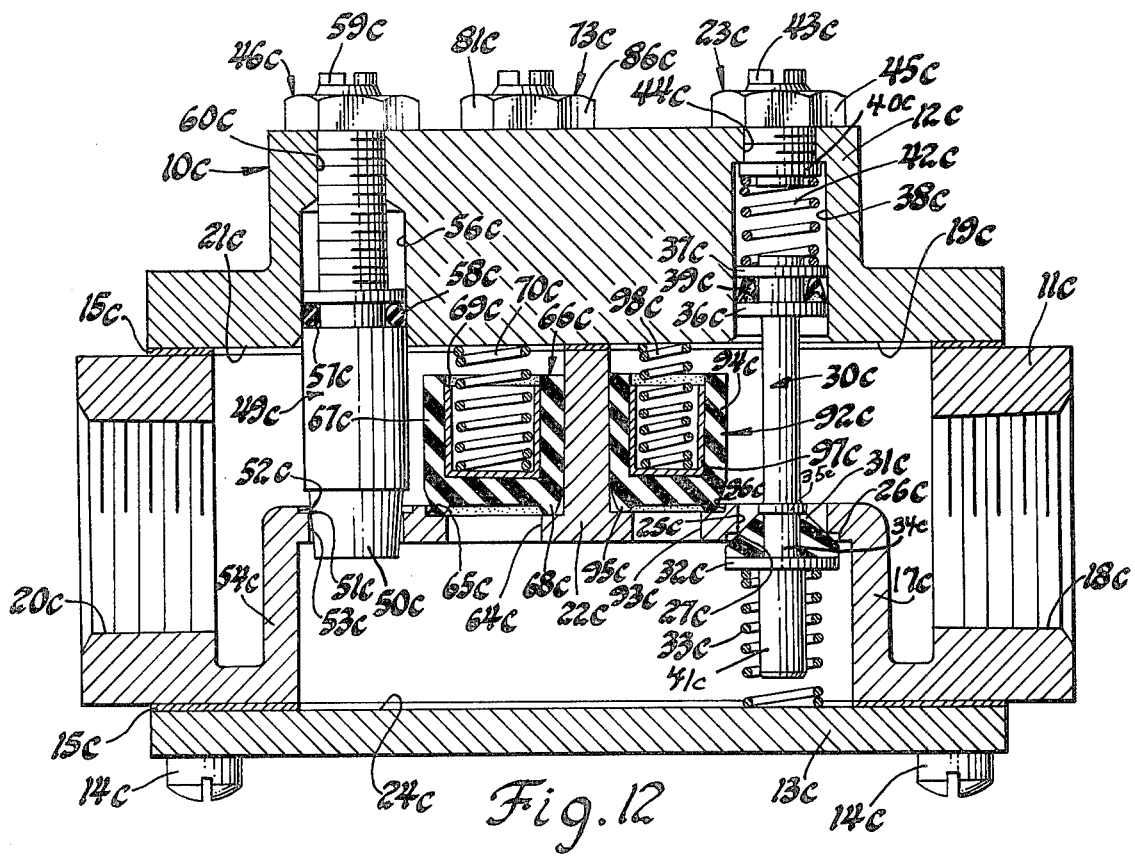
FIG. 12 is an elevation section view of a modified embodiment of the valve illustrated in FIG. 9, and made in accordance with the principles of the present invention.
Figure 13:
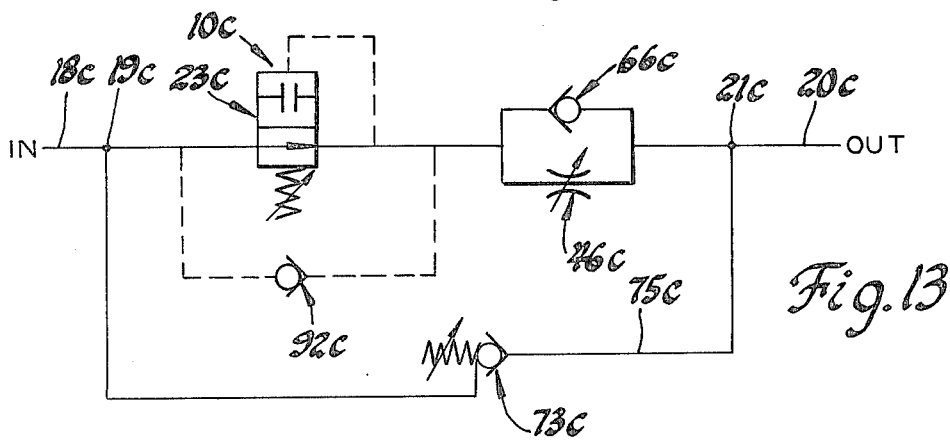
FIG. 13 is a schematic view of the valve structure illustrated in FIG. 12 and showing the various functions carried out by the valve.

FIGS. 12 and 13 illustrate a modified embodiment 10c of the valve illustrated in FIG. 9. The parts of the embodiment of FIGS. 12 and 13 which are the same as the embodiment of FIGS. 9, 10 and 11, have been marked with the same reference numerals followed by the small letter "c".

The embodiment of FIGS. 12 and 13 discloses the same valve structure as that shown in FIGS. 9 and 10, with the exception that the check valve 66c is inverted so as to provide a free flow path from the lower interior passageway 24c when fluid is flowing from the supply port 18c through the valve 10c and out the port 20c. In the embodiment illustrated in FIGS. 12 and 13, when fluid is exhausted or returning through the valve 10c, it enters the port 20c and passes into the upper interior passageway 21c and thence down past the flow control valve means 46c to provide a meter out action on the returning fluid. The returning fluid maintains the check valve 66 in a closed position. The returning fluid metered out into the lower interior passageway 24c passes upwardly through the passage 25c, around the open poppet valve element 31c, and into the upper interior passageway 19c and then out through the upstream port 18c. In the embodiment of FIGS. 12 and 13, the exhausting fluid also passes upwardly from the lower interior passageway 24c up through the passageway 93c to open the relief check valve 92c and provide an additional free flow exhaust passage to the upper interior passageway 19c and thence out the port 18c. In the embodiment of FIGS. 12 and 13, the pre-exhaust valve 73c would function in the same manner as described hereinbefore for the embodiment of FIGS. 7 and 8.

Figure 16:
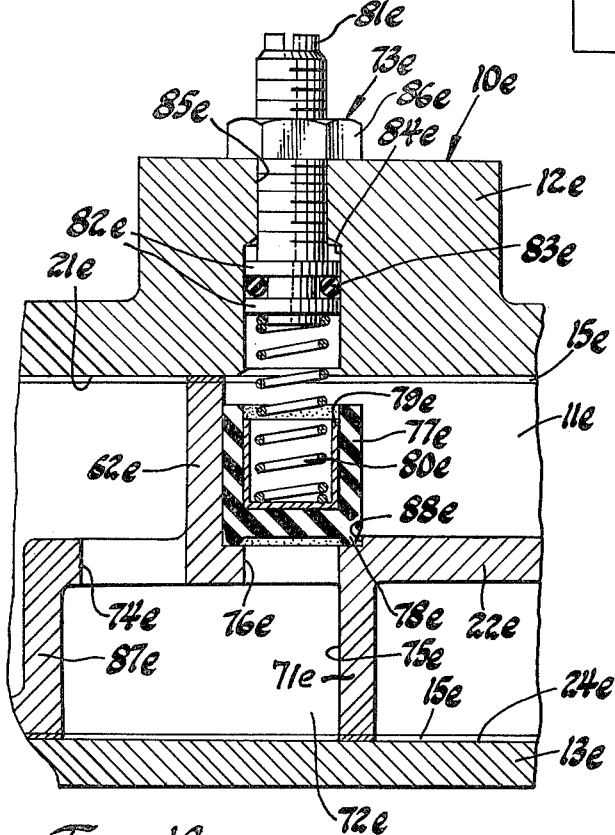
FIG. 16 is a fragmentary elevation section view of a preexhaust valve employed with the embodiments of the valve structures of FIGS. 9-11, and 12 and 13.

FIG. 16 illustrates an exhaust valve 73e which is used with the embodiments illustrated in FIGS. 9 through 11, and FIGS. 12 and 13. The parts of the pre-exhaust valve 73e which are the same as the first disclosed pre-exhaust valve 73 of FIG. 3 are marked with the same reference numerals followed by the small letter "e". The pre-exhaust valve 73e functions in the same manner as the previously described valve 73 of FIG. 7.

Figure 14:
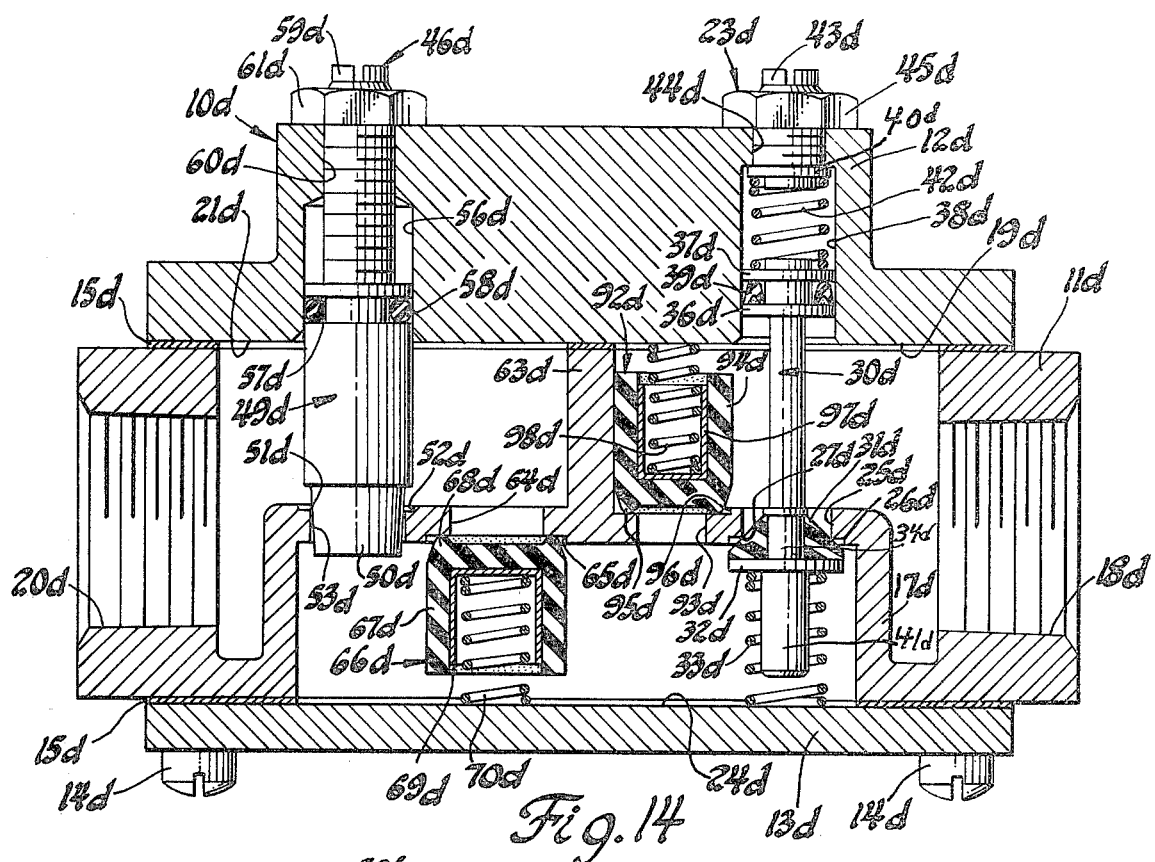
FIG. 14 is an elevation section view of a fourth valve embodiment, made in accordance with the principles of the present invention.
Figure 15:
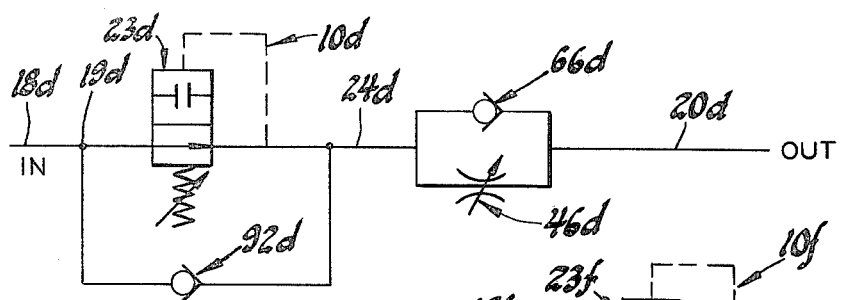
FIG. 15 is a schematic view of the valve structure illustrated in FIG. 14 and showing the various functions carried out by the valve.

FIGS. 14 and 15 illustrate a fourth embodiment of the invention which is generally indicated by the numeral 10d. The parts of the embodiment illustrated in FIGS. 14 and 15 which are the same as the embodiment of FIGS. 9–11, have been marked with the same reference numerals followed by the small letter "d".

The embodiment of FIGS. 14 and 15 discloses the same valve structure as that shown in FIGS. 9–11, with the exception that the pre-exhaust valve 73b of the embodiment of FIGS. 9 through 11 has been eliminated. Accordingly, the embodiment of FIGS. 14 and 15 provides a pressure regulating function and meter in function when fluid is flowing through the valve 10d from the upstream port 18d to the downstream port 20d, and a free flow out function when fluid is being exhausted through the valve 10d from the downstream port 20d and out the upstream port 18d, with the function of the relief check valve 92d.

Figure 17:
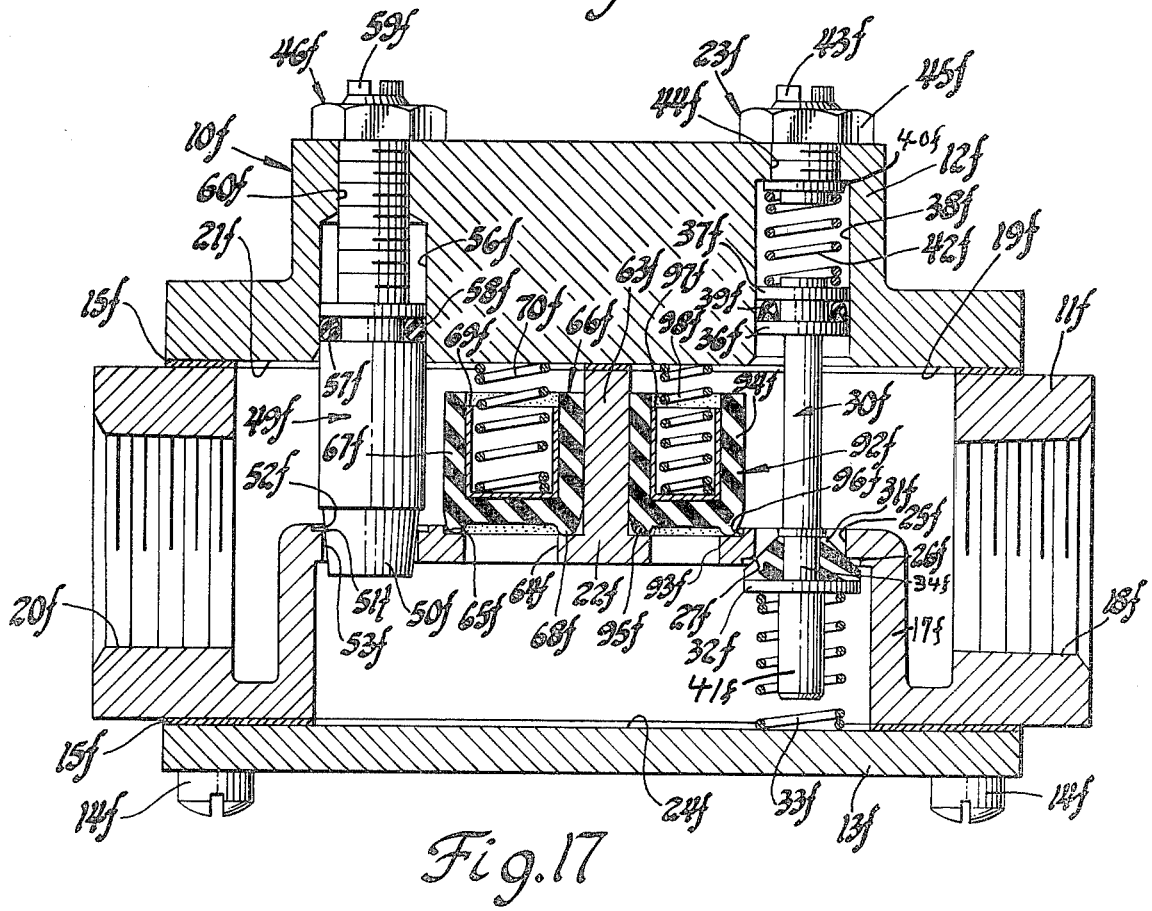
FIG. 17 is an elevation section view of a fifth valve embodiment made in accordance with the principles of the present invention.
Figure 18:
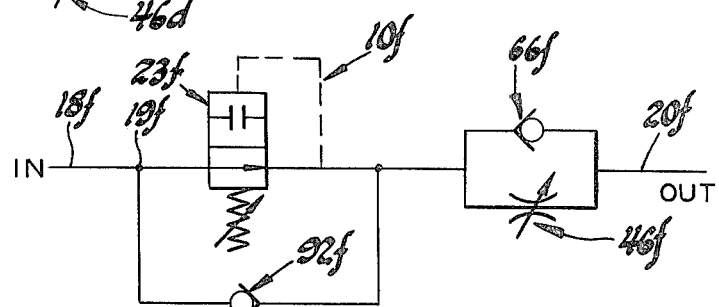
FIG. 18 is a schematic view of the valve illustrated in FIG. 17 and showing the various functions carried out by said valve.

The embodiment of FIGS. 17 and 18 illustrate a fifth embodiment of the invention which is generally indicated by the numeral 10f. The parts of the embodiment 10f illustrated in FIGS. 17 and 18 which are the same as the embodiment of FIGS. 12 and 13 have been marked with the same reference numerals followed by the small letter "f".

The embodiment of FIGS. 17 and 18 discloses the same valve structure as that shown in FIGS. 12 and 13, with the exception that the pre-exhaust valve 73c of the embodiment of FIGS. 12 and 13 has been eliminated. Accordingly, the embodiment of FIGS. 17 and 18 provides a pressure regulating function and a free flow in function when fluid is flowing through the valve 10f from the upstream port 18f to the downstream port 20f, and a meter out function when fluid is being exhausted through the valve 10f from the downstream port 20f and out the upstream port 18f, together with the function of the relief check valve 92f.

Figure 20:
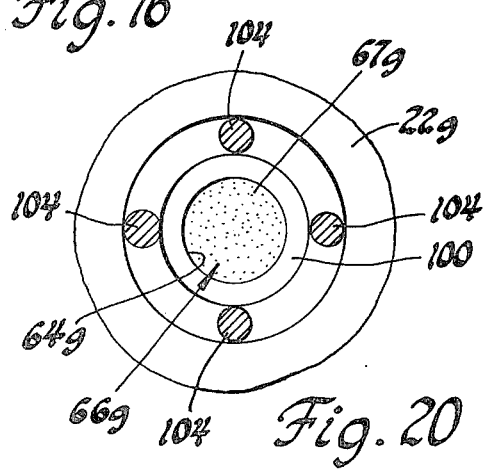
FIG. 20 is a horizontal section view of the check valve structure illustrated in FIG. 19, taken along the line 20—20 thereof, and looking in the direction of the arrows.
Figure 19:
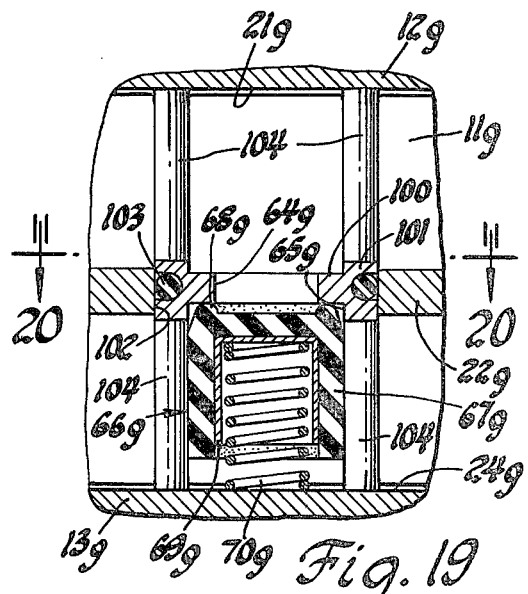
FIG. 19 is a fragmentary, elevation section view of a reversible check valve structure, and showing the check valve in one position.

FIGS. 19 and 20 illustrate a reversible check valve structure which can be employed in any of the aforedescribed embodiments of the invention. The parts of the check valve structure illustrated in FIGS. 19 and 20 which are the same as the check valve structure illustrated in FIG. 2, have been marked with the same reference numerals followed by the small letter "g". As shown in FIG. 19, the check valve 66g is carried in a birdcage type of carrier structure which includes a central plate 100 which has a peripheral, transverse, annular flange 101 that is adapted to be seated in a bore 102 formed in the valve body interior longitudinal wall 22g. A plurality of support and guide rods 104 are integrally formed on the upper and lower sides of the annular flange 101. The lower set of four support and guide rods 104 extend downwardly into the lower interior chamber 24g and they abut against the inner face of the bottom end cover 13g. The upper set of support rods 104 extend upwardly into the upper interior passageway 11g, and they abut against the inner surface of the top end cover 12g. It will be seen that the check valve 66g is guided in its upward and downward movement by the birdcage support and guide rods 104. The check valve 66g operates and functions in the same manner as described hereinbefore for the check valve 66 of the first embodiment of FIGS. 1 through 6.

Figure 21:
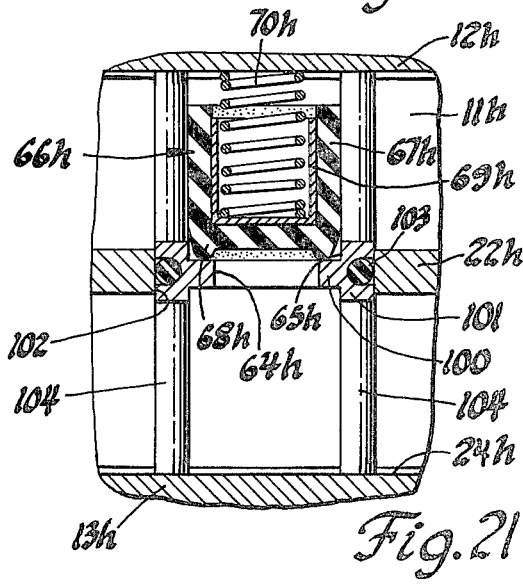
FIG. 21 is a fragmentary, elevation section view, similar to FIG. 19, but showing the check valve of FIG. 19 in a reversed position.

FIG. 21 shows the reversible check valve illustrated in FIGS. 19 and 20 disposed in an upper position. The check valve 66g of FIGS. 19 and 20 provides a free flow out function, while the reversed check valve 66h of FIG. 21 provides a free flow in function.

While it will be apparent that the preferred embodiments of the invention herein disclosed are well calculated to fulfill the objects above listed, it will be appreciated that the invention is susceptible to modification, variation and change.

What is claimed is:

1. In a combination pressure regulating and flow control air valve for controlling the fluid flow through a fluid flow circuit which includes a fluid controlled apparatus, the combination comprising:
    (a) a valve body and cover means having an upstream pressurized fluid supply port for connection to a source of pressurized fluid, and a downstream working port for connection to the fluid controlled apparatus in said fluid flow circuit, and a fluid flow passage interconnecting said ports;
    (b) an adjustable pressure regulator valve means operatively mounted in said fluid flow passage to provide a regulated downstream pressure at the downstream working port when fluid is flowing from the source of pressurized fluid into the upstream port and to the downstrea port;
    (c) an adjustable fluid flow control valve means operatively mounted in said fluid flow passage downstream from said adjustable pressure regulator valve means to provide a metering action to the flow of fluid flowing through said fluid flow passage in one direction;
    (d) a check valve means operatively mounted in said fluid flow passage in parallel with said adjustable fluid flow control valve means and in series with said adjustable pressure regulator valve means to provide a free flow action to the fluid flowing through said fluid flow passage in a direction opposite to said one direction; and, (e) said adjustable pressure regulator valve means comprising a balanced spring biased poppet valve having an adjustble first spring on the upstream side to bias the poppet valve in the opening direction to an open position, and a second spring on the downstream side to lightly bias the poppet valve in the closing direction.

2. A combination pressure regulating and flow control valve structure as defined in claim 1, wherein:

(a) said adjustable fluid flow control valve means and check valve means are operatively mounted in said fluid flow passage to provide a free flow of the fluid when fluid is flowing from said upstream port to said downstream port, and to provide a meter out action when fluid is exhausted from said downstream port through said fluid flow passage and out the upstream port.

3. A combination pressure regulating and flow control valve as defined in claim 2, including:

(a) a relief check valve means operatively mounted in said fluid flow passage in parallel with the pressure regulator valve means and operative to force the flow of fluid through said pressure regulator valve means when fluid is flowing through said fluid flow passage from said upstream port to said downstream port, and to bypass the flow of fluid around said pressure regulator valve means when fluid is exhausted from said downstream port and through said fluid flow passage and out the upstream pressure port.

4. A combination pressure regulating and flow control valve structure as defined in claim 3, including:

(a) an adjustable quick exhaust valve means operatively mounted in a second fluid flow passage that is parallel to the first named fluid flow passage, for bypassing the pressure regulator valve means, first named check valve means, relief check valve means, and fluid flow control valve means for exhausting excess pressure from said downstream pressure port and through said second fluid flow passage and out said upstream pressure port.

5. A combination pressure regulating and flow control valve structure as defined in claim 2, including:

(a) an adjustable quick exhaust valve means operatively mounted in a second fluid flow passage that is parallel to the first named fluid flow passage, for bypassing the pressure regulator valve means, first named check valve means, relief check valve means, and fluid flow control valve means for exhausting excess pressure from said downstream pressure port and through said second fluid flow passage and out said upstream pressure port.

6. A combination pressure regulating and flow control valve structure as defined in claim 1, wherein:

(a) said adjustable fluid flow control valve means and check valve means are operatively mounted in said fluid flow passage to provide a meter in action when fluid is flowing through said fluid flow passage from said upstream port to said downstream port, and to provide a free flow of fluid when fluid is exhausted from said downstream port through said fluid flow passage and out the upstream port.

7. A combination pressure regulating and flow control valve as defined in claim 6, including:

(a) a relief check valve means operatively mounted in said fluid flow passage in parallel with the pressure regulator valve means and operative to force the flow of fluid through said pressure regulator valve means when fluid is flowing through said fluid flow passage from said upstream port to said downstream port, and to bypass the flow of fluid around said pressure regulator valve means when fluid is exhausted from said downstream port and through said fluid flow passage and out the upstream pressure port.

8. A combination pressure regulating and flow control valve structure as defined in claim 7, including:

(a) an adjustable quick exhaust valve means operatively mounted in a second fluid flow passage that is parallel to the first named fluid flow passage, for bypassing the pressure regulator valve means, first named check valve means, relief check valve means, and fluid flow control valve means for exhausting excess pressure from said downstream pressure port and through said second fluid flow passage and out said upstream pressure port.

9. In a combination pressure regulating and flow control valve, the combination comprising:

(a) a valve body and cover means having an upstream port and a downstream port, and a fluid flow passage interconnecting said ports;

(b) an adjustable pressure regulator valve means operatively mounted in said fluid flow passage to provide a regulated downstream pressure at the downstream pressure port;

(c) an adjustable fluid flow control valve means operatively mounted in said fluid flow passage to provide a metering action to the flow of fluid flowing through said fluid flow passage in one direction;

(d) a check valve means operatively mounted in said fluid flow passage in parallel with said adjustable fluid flow control valve means to provide a free flow action to the fluid flowing through said fluid flow passage in a direction opposite to said one direction;

(e) said adjustable fluid flow control valve means and check valve means being operatively mounted in said fluid flow passage to provide a meter in action when fluid is flowing through said fluid flow passage from said upstream port to said downstream port, and to provide a free flow of fluid when fluid is exhausted from said downstream port through said fluid flow passage and out the upstream port; and, (f) an adjustable quick exhaust valve means operatively mounted in a second fluid flow passage that is parallel to the first named fluid flow passage, for bypassing the pressure regulator valve means, first named check valve means, and fluid flow control valve means for exhausting excess pressure from said downstream pressure port and through said second fluid flow passage and out said upstream pressure port.

10. In a combination pressure regulating and flow control valve, the combination comprising:

(a) a valve body and cover means having an upstream port and a downstream port, and a fluid flow passage interconnecting said ports;

(b) an adjustable pressure regulator valve means operatively mounted in said fluid flow passage to provide a regulated downstream pressure at the downstream pressure port;

(c) an adjustable fluid flow control valve means operatively mounted in said fluid flow passage to provide a metering action to the flow of fluid flowing through said fluid flow passage in one direction;

(d) a check valve means operatively mounted in said fluid flow passage in parallel with said adjustable fluid flow control valve means to provide a free flow action to the fluid flowing through said fluid flow passage in a direction opposite to said one direction; and, (e) said check valve means comprising a reversible cartridge valve means.

11. A combination pressure regulating and flow control valve as defined in claim 10, wherein said reversible cartridge valve means includes:

(a) a plate-like member having a passage formed therethrough;

(b) a plurality of guide rods integrally attached to said platelike member and being spaced evenly around said plate like member;

(c) a check valve slidably mounted within said guide rods; and, (d) means for normally biasing said check valve into seating engagement with said plate-like member for normally closing said passage formed therethrough.

12. A combination pressure regulating and flow control valve as defined in claim 11, wherein:

(a) said means for biasing said check valve comprises a spring means.

13. A combination pressure regulating and flow control valve as defined in claim 10, wherein said adjustable pressure regulator valve means includes:

(a) an inlet seat in said fluid flow passage;

(b) a valve element movably supported in said passage for operative engagement with said valve seat; and, (c) an adjustable spring means operatively engaged with said valve element for normally biasing the valve element to an open position spaced from said inlet seat.

14. A combination pressure regulating and flow control valve as defined in claim 13, wherein said adjustable pressure regulator valve means includes:

(a) a fixed spring means operatively engaged with said valve element for lightly biasing the valve element in a closing direction toward said inlet seat.

15. A combination pressure regulating and flow control valve as defined in claim 14, wherein said adjustable pressure regulator valve means includes:

(a) a pressure balancing seal means opposed to said valve element and sealing an area equal to the area of said valve seat engaged by the valve element.

16. A combination pressure regulating and flow control valve as defined in claim 15, wherein:

(a) said valve element is a conically shaped poppet valve.

* * * * *

UNITED STATES PATENT OFFICE
CERTIFICATE OF CORRECTION

Patent No. 4,182,360   Dated January 8, 1980

Inventor(s) James A. NEFF

It is certified that error appears in the above-identified patent and that said Letters Patent are hereby corrected as shown below:

Column 1, line 67, following "in", "condiction" should be --condition--.

Column 4, line 17, following "in", "FIGS" should be --Fig.--.

Column 10, line 58, after "the", "downstrea" should be --downstream--.

Signed and Sealed this

Twenty-fifth Day of March 1980

[SEAL]

Attest:

SIDNEY A. DIAMOND

Attesting Officer    Commissioner of Patents and Trademarks